US012279103B2

(12) United States Patent
Vilermo et al.

(10) Patent No.: US 12,279,103 B2
(45) Date of Patent: Apr. 15, 2025

(54) APPARATUS, METHODS AND COMPUTER PROGRAMS FOR PROCESSING SPATIAL AUDIO

(71) Applicant: Nokia Technologies Oy, Espoo (FI)

(72) Inventors: Miikka Tapani Vilermo, Siuro (FI); Jorma Juhani Makinen, Tampere (FI)

(73) Assignee: Nokia Technologies OY, Espoo (FI)

( * ) Notice: Subject to any disclaimer, the term of this patent is extended or adjusted under 35 U.S.C. 154(b) by 94 days.

(21) Appl. No.: 17/959,668

(22) Filed: Oct. 4, 2022

(65) Prior Publication Data

US 2023/0113833 A1 Apr. 13, 2023

(30) Foreign Application Priority Data

Oct. 7, 2021 (GB) .................................... 2114345

(51) Int. Cl.
*H04S 7/00* (2006.01)
*H04R 3/00* (2006.01)
*H04R 5/04* (2006.01)

(52) U.S. Cl.
CPC ............... *H04S 7/30* (2013.01); *H04R 3/005* (2013.01); *H04R 5/04* (2013.01)

(58) Field of Classification Search
None
See application file for complete search history.

(56) References Cited

U.S. PATENT DOCUMENTS

| | | | | |
|---|---|---|---|---|
| 8,165,326 | B2 * | 4/2012 | Ohashi | H04S 7/30 381/310 |
| 2016/0088393 | A1 | 3/2016 | Miyasaka et al. | 5/4 |
| 2019/0139312 | A1 | 5/2019 | Leppanen et al. | 19/6 |
| 2021/0329373 | A1 * | 10/2021 | Pawlak | H04R 3/005 |

* cited by examiner

*Primary Examiner* — Paul W Huber
(74) *Attorney, Agent, or Firm* — McCarter & English, LLP

(57) ABSTRACT

Examples of the disclosure relate to apparatus, methods and computer programs for processing spatial audio to reduce the effects of errors within the spatial audio. The apparatus can be configured to obtain spatial audio and associated one or more three-dimensional parameters wherein the one or more three-dimensional parameters comprise one or more direction parameters. The apparatus can also be configured to determine one or more ranges for direction parameters when the one or more three-dimensional parameters are reduced to two dimensions to obtain one or more two-dimensional parameters. The apparatus can also be configured to apply processing to the one or more two-dimensional parameters based on whether or not the one or more ranges in two dimensions are in accordance with one or more criteria.

20 Claims, 6 Drawing Sheets

APPARATUS, METHODS AND COMPUTER PROGRAMS FOR PROCESSING SPATIAL AUDIO

TECHNOLOGICAL FIELD

Examples of the disclosure relate to apparatus, methods and computer programs for processing spatial audio. Some relate to apparatus, methods and computer programs for processing spatial audio to reduce the effects of errors within the spatial audio.

BACKGROUND

Spatial audio can be captured in three dimensions. However, due to limitations of the playback devices, bitrate limitations or any other suitable factors the spatial audio might need to be reduced to two dimensions before it is played back.

BRIEF SUMMARY

According to various, but not necessarily all, examples of the disclosure there is provided an apparatus for processing spatial audio comprising means for:

obtaining spatial audio and associated one or more three-dimensional parameters wherein the one or more three-dimensional parameters comprise one or more direction parameters;

determining one or more ranges for direction parameters when the one or more three-dimensional parameters are reduced to two dimensions to obtain one or more two-dimensional parameters; and applying processing to the one or more two-dimensional parameters based on whether or not the one or more ranges in two dimensions are in accordance with one or more criteria.

Determining one or more ranges for direction parameters may comprise identifying one or more ranges within the three-dimensional parameters and reducing the one or more ranges to two dimensions.

If the one or more ranges are above a threshold a first process may be applied to the one or more two-dimensional parameters and if the one or more ranges are below the threshold process or a second different process may be applied to the one or more two-dimensional parameters.

If one or more ranges span over an axis a first process may be applied to the one or more two-dimensional parameters and if the one or more ranges do not span over an axis relative to a user position no process or a second process may be applied to the one or more two-dimensional parameters.

The axis may comprise a left-right axis.

The axis may comprise a front-back axis.

The one or more ranges for direction parameters may comprise an error margin.

The processing may comprise error concealment processing.

A first error concealment process may comprise reducing the effect of the error margin within the spatial audio.

A first error concealment process may comprise reducing directionality of the spatial audio.

The first process may comprise reducing the ratio of direct to ambient components within the one or more parameters.

The ranges for direction parameters may be determined by at least one of; location of a sound source; movement of a sound source.

The processing may comprise processing to limit one or more ranges of the one or more two dimensional parameters.

The apparatus may comprise means for converting the three-dimensional parameters to two dimensions.

The one or more three dimensional parameters may comprise three-dimensional spatial metadata.

The spatial metadata may comprise, for one or more frequency sub-bands, information indicative of;

a sound direction, and sound directionality.

The spatial audio may be based on at least two microphone signals.

The apparatus may comprise means for enabling playback of the spatial audio.

According to various, but not necessarily all, examples of the disclosure there may be provided an apparatus comprising at least one processor; and at least one memory including computer program code, the at least one memory and the computer program code configured to, with the at least one processor, cause the apparatus at least to perform:

obtaining spatial audio and associated one or more three-dimensional parameters wherein the one or more three-dimensional parameters comprise one or more direction parameters;

determining one or more ranges for direction parameters when the one or more three-dimensional parameters are reduced to two dimensions to obtain one or more two-dimensional parameters; and applying processing to the one or more two-dimensional parameters based on whether or not the one or more ranges in two dimensions are in accordance with one or more criteria.

According to various, but not necessarily all, examples of the disclosure there may be provided an electronic device comprising an apparatus as described herein.

According to various, but not necessarily all, examples of the disclosure there may be provided a method comprising:

obtaining spatial audio and associated one or more three-dimensional parameters wherein the one or more three-dimensional parameters comprise one or more direction parameters;

determining one or more ranges for direction parameters when the one or more three-dimensional parameters are reduced to two dimensions to obtain one or more two-dimensional parameters; and applying processing to the one or more two-dimensional parameters based on whether or not the one or more ranges in two dimensions are in accordance with one or more criteria.

According to various, but not necessarily all, examples of the disclosure there may be provided a computer program comprising computer program instructions that, when executed by processing circuitry, cause:

obtaining spatial audio and associated one or more three-dimensional parameters wherein the one or more three-dimensional parameters comprise one or more direction parameters;

determining one or more ranges for direction parameters when the one or more three-dimensional parameters are reduced to two dimensions to obtain one or more two-dimensional parameters; and applying processing to the one or more two-dimensional parameters based on whether or not the one or more ranges in two dimensions are in accordance with one or more criteria.

According to various, but not necessarily all, examples of the disclosure there may be provided an apparatus for processing spatial audio comprising means for:

obtaining spatial audio and associated one or more three-dimensional parameters wherein the one or more three-dimensional parameters comprise one or more direction parameters;

determining one or more ranges for direction parameters when the one or more three-dimensional parameters are mapped to two dimensions to obtain one or more two-dimensional parameters;

applying processing to the one or more two-dimensional parameters based on whether or not the one or more ranges in two dimensions satisfy one or more criteria.

BRIEF DESCRIPTION

Some examples will now be described with reference to the accompanying drawings in which:

FIGS. 1A to 1D schematically show error margins in spatial audio;

DETAILED DESCRIPTION

Figure 1A:
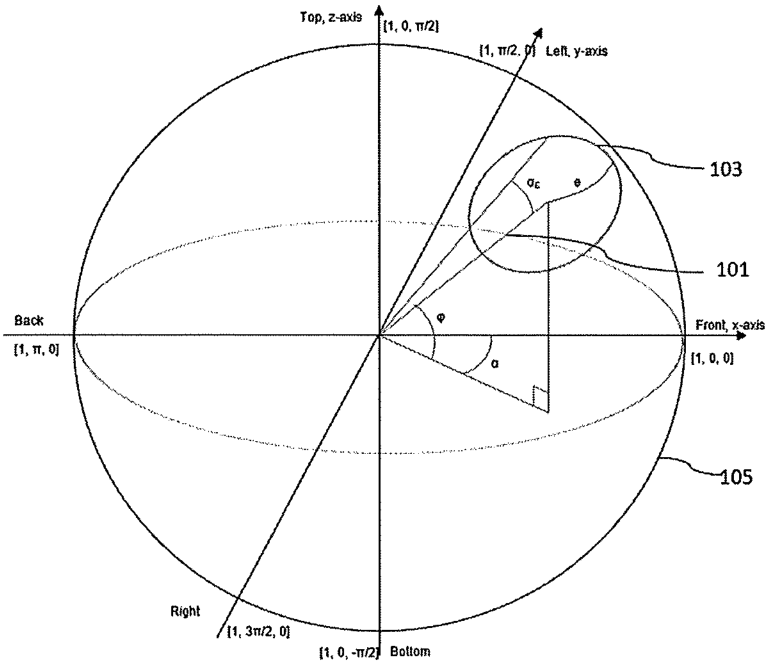

Audio signals representing spatial audio can be captured in three dimensions. For example, they can be captured by microphones that are spatially distributed so that one or more microphones is positioned in a different plane to other microphones. This can enable audio signals to represent audio three-dimensional audio scenes.

The spatial audio can be associated with one or more parameters such as spatial metadata. The spatial metadata, or other types of parameters, comprises information relating to one or more spatial properties of spatial sound environments represented by the audio signals. The spatial metadata or other parameters can be used to enable spatial rendering of the audio signals.

The spatial metadata or other parameters can be associated with the audio signals so as to enable processing of the at least one signal based on the obtained spatial metadata or other parameters. For example, the processing could comprise rendering of spatial audio using the audio signal and the associated spatial metadata or any other suitable processing. The spatial metadata or other parameters can be associated with the spatial audio so that the spatial metadata or other parameters can be transmitted with the spatial audio and/or the spatial metadata or other parameters can be stored with the spatial audio.

In examples where the spatial audio is captured in three dimensions the spatial metadata or other parameters can also be three dimensional. The three-dimensional spatial metadata or other parameters represents the directional parameters of the spatial audio in three dimensions. For example, angular information within the three-dimensional spatial metadata can comprise azimuthal angles and also angles of elevation.

In some cases, even though the spatial audio is captured in three dimensions it might need to be rendered and played back in two dimensions. This means that the spatial metadata or other parameters might need to be reduced from three dimensions to two dimensions. This reducing to two dimensions might be for bitrate savings or might be due to limitations of a playback device or for any other suitable reason. For instance, loudspeaker systems often only have loudspeakers in a single plane and so can only enable playback of the spatial audio in two dimensions.

The directional components of the spatial metadata or other parameters might include error. That is, there might be some deviation between the actual direction of the spatial audio and the estimated direction within the spatial metadata or other parameters. The error could occur due to suboptimal microphone locations, less than perfectly calibrated microphones, limitations on the number of microphones, microphone locations or any other suitable factor. The directional components of the spatial metadata or other parameters can therefore comprise one or more error margins. The error margins can indicate the area in which the actual direction can be expected to occur with a high level of confidence.

When the directions have been estimated in three dimensions and the playback is also in three dimensions then the errors and the error margins remain the same, or approximately the same, in playback as in capture. However, when the directions of the spatial metadata are estimated in three dimensions but the playback is in two dimensions then the reducing from three dimensions to two dimensions can increase the size of the errors and error margins and/or can increase the effects of errors and error margins.

FIGS. 1A to 1D show how reducing from three dimensions to two dimensions can affect ranges such error margins. The reducing comprises mapping the data from three dimensions to two dimensions.

FIG. 1A schematically illustrates a range 103 for a directional parameter. The directional parameter could be a directional component of three-dimensional spatial metadata or any other suitable type of parameter.

In this example the range comprises an error margin 103. The size of the error margin 103 is determined by errors within the directional parameter. In some examples the range could be defined by possible positions of a sound source, movement of a sound source or any other suitable factor.

In this example the direction 101 has an azimuth a and elevation (p. The error in the direction 101 is given as an angle $\alpha_E$. The angle $\alpha_E$ represents a difference between the actual direction for the audio and the direction estimated for the parameter. In this example the error $\alpha_E$ is the same in all directions. This generates the error margin 103 comprising a circle on a three-dimensional surface. FIG. 1A shows the error margin 103 as a circle on the surface of a unit sphere 105.

In this example the angular error $\alpha_E$ is assumed to be the same in all directions. This leads to the error margin 103 having a circular shape. In other examples the angular error $\alpha_E$ could be different in different directions. This could lead to the error margin 103 having a shape other than a circle. For example, if the angular error $\alpha_E$ is different in different directions then the error margin could have an irregular shape when projected onto the surface of a unit sphere.

Figure 1B:
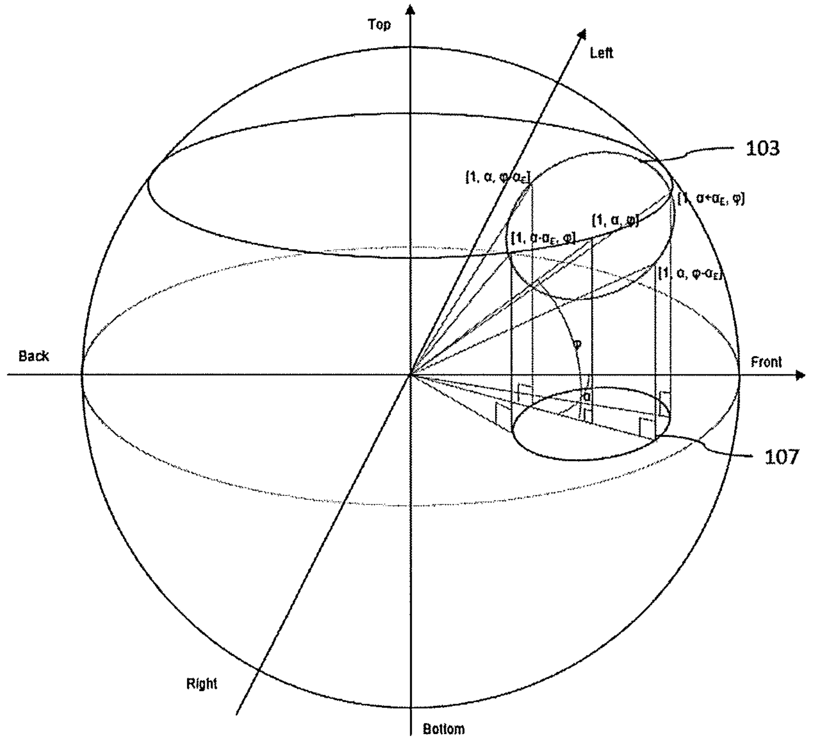

FIG. 1B shows the three-dimensional error margin 103 reduced to a two-dimensional error margin 107. This determines the potential error when the audio signal is played back in two dimensions.

For conciseness, FIG. 1B only focuses on four points of the circular error margin 103 and their projections into two dimensions. These points are $[1, \alpha-\alpha_E, \varphi]$, $[1, \alpha+\alpha_E, \varphi]$, $[1, \alpha, \varphi-\alpha_E]$, and $[1, \alpha, \varphi+\alpha_E]$ in spherical coordinates. These points are illustrated in FIG. 1B.

Their projections of these four points onto the xy-plane are: [cos(φ), α−$\alpha_E$, 0], [cos(φ), α+$\alpha_E$, 0], [cos(φ−$\alpha_E$), α, 0], and [cos(φ+$\alpha_E$), α, 0] in spherical coordinates. X and Y coordinates for these are:

| Point in spherical coordinates | X-coordinate | Y-coordinate |
|---|---|---|
| [cos(φ), α − $\alpha_E$, 0] | $x_1 = \cos(\varphi)\cos(\alpha - \alpha_E)$ | $y_1 = \cos(\varphi)\sin(\alpha - \alpha_E)$ |
| [cos(φ), α + $\alpha_E$, 0] | $x_2 = \cos(\varphi)\cos(\alpha - \alpha_E)$ | $y_2 = \cos(\varphi)\sin(\alpha + \alpha_E)$ |
| [cos(φ − $\alpha_E$), α, 0] | $x_3 = \cos(\varphi - \alpha_E)\cos(\alpha)$ | $y_3 = \cos(\varphi - \alpha_E)\sin(\alpha)$ |
| [cos(φ + $\alpha_E$), α, 0] | $x_4 = \cos(\varphi + \alpha_E)\cos(\alpha)$ | $y_4 = \cos(\varphi + \alpha_E)\sin(\alpha)$ |

For conciseness, other points on the circular error margin and the two-dimensional error margin 107 were not calculated.

Figure 1C:
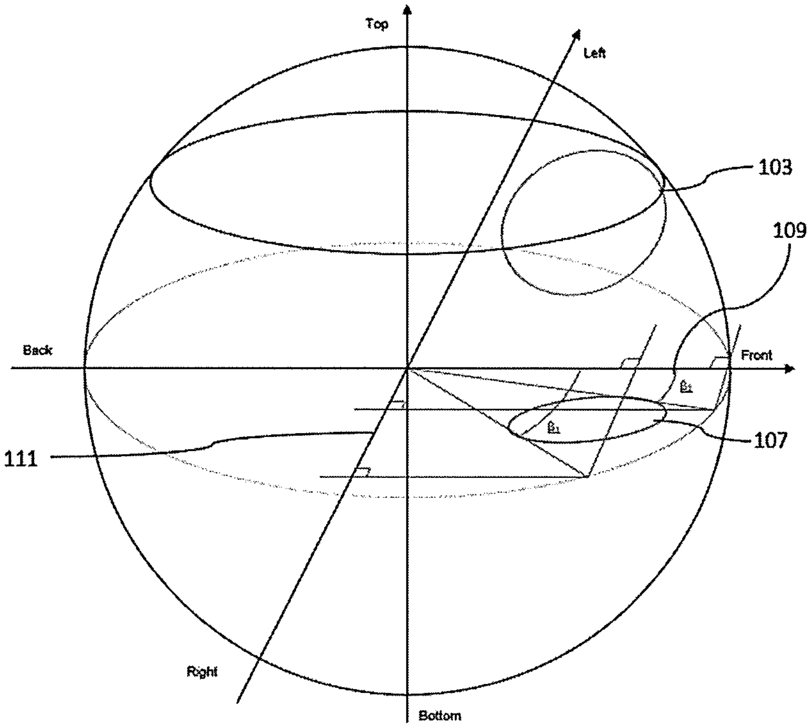

FIG. 1C shows how this error margin 107 in two dimensions provides a front-back error 109 and a left-right error 111. The front back error is the error in the axis parallel to, or substantially parallel to, the direction in which the user is facing. The left-right error is the error in the axis, perpendicular to, or substantially perpendicular to the direction in which the user is facing. The left-right axis is therefore perpendicular to, or substantially perpendicular to the front-back axis. The left-right axis can run between the left-hand side and the right-hand side of the user. In this example, the front-back axis is shown as the x-axis and the left-right axis is shown as the y-axis.

Figure 1D:
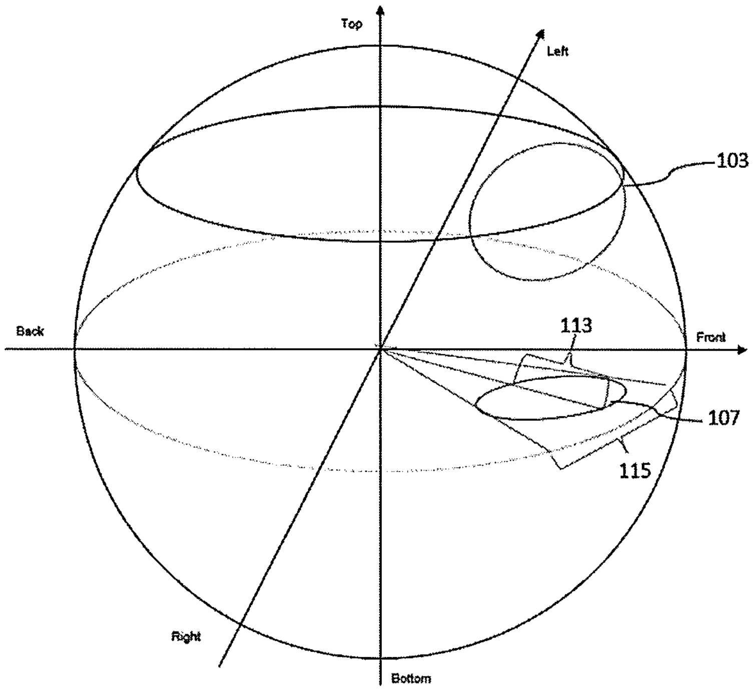

FIG. 1D shows how this error margin 107 in two dimensions provides a radial error 113 and a tangential error 115. The radial error 113 is the diameter of the projected error margin 107 along a line that passes through the origin and travels on the xy-plane. The tangential error 115 is the arc in the unit circle on the xy-plane covered by the projected error margin 107. The tangential error 115 describes how wide the erroneous directions can spread in two-dimensions and the radial error 113 describes how much error is caused by the two-dimensional directions not being able to represent elevation.

The azimuths for points [$x_1$, $y_1$], and [$x_2$, $y_2$ are given by:

$$\beta_1 = \tan^{-1}\frac{y_1}{x_1}$$

$$\beta_2 = \tan^{-1}\frac{y_2}{x_2}$$

These azimuths can be used to determine error margins or any other suitable ranges.

The front-back error can be calculated as:

$$\text{FB error} = \|\cos\beta_2 - \cos\beta\|$$

The left-right error can be calculated as:

$$\text{LR error} = \|\sin\beta_2 - \sin\beta\|$$

Radial error is:

$$\text{Rad error} = \left\|\sqrt{x_1^2 + y_1^2} - \sqrt{x_2^2 + x_2^2}\right\|$$

And tangential error in degrees is:

$$\text{Tan error} = \|\beta_2 - \beta_1\|$$

Special handling is needed for the case when $\varphi > \pi - \alpha_E$ or $\varphi < -\pi + \alpha_E$. In these cases the error circle encompasses either north or south pole of the unit sphere and in these cases the tangential error has a numerical value 360 degrees.

Other axis can be used in other examples of the disclosure.

The error margins 103 can increase when the data is reduced from three-dimensions to two dimensions. When the error is in three-dimensions the error remains within a solid angle. However, when this is reduced to two dimensions this magnitude of the error margin in the x-direction and/or the y-direction can increase.

The effects of the error can be different in three-dimensions compared to two-dimensions. For example, in three dimensions if an error spans over a front-back axis or a left-right axis then this can be accommodated by the three-dimensional array of loudspeakers in the playback system. However, if this is reduced to two dimensions an error margin that spans over a front-back axis or a left-right axis could cause the audio to be flipping between front and back or between left and right when it is being rendered. Such persistent switching would be audible to a user and so would provide reduced quality of the rendered audio and so would be problematic.

The examples of FIGS. 1A to 1D show a range comprising an error margin being reduced to two dimensions. Other types of ranges could be used in other examples of the disclosure. The ranges could be any area or volume defined by the one or more parameters associated with the spatial audio. In some examples the ranges could comprise a location or area associated with a sound source. For example, it could be a location of a user within a teleconference or an area to which a user in a teleconference is assigned to prevent overlapping with other users of the teleconference. These ranges can change when the directional parameters are reduced from three-dimensions to two dimensions similar to the error margins shown in FIGS. 1A to 1D.

Examples of the disclosure relate to apparatus, methods and processes for addressing the problems arising from reducing of these error ranges from three dimensions to two dimensions.

Figure 2:
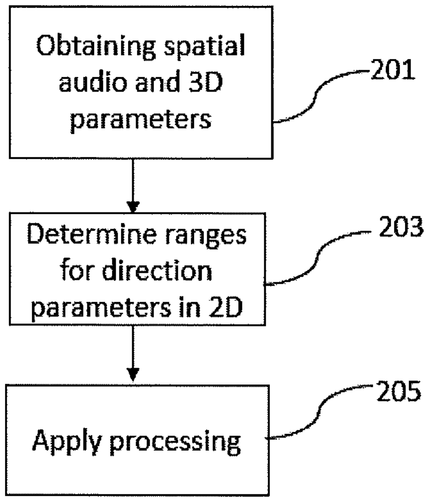
FIG. 2 shows an example method.
Figure 4:
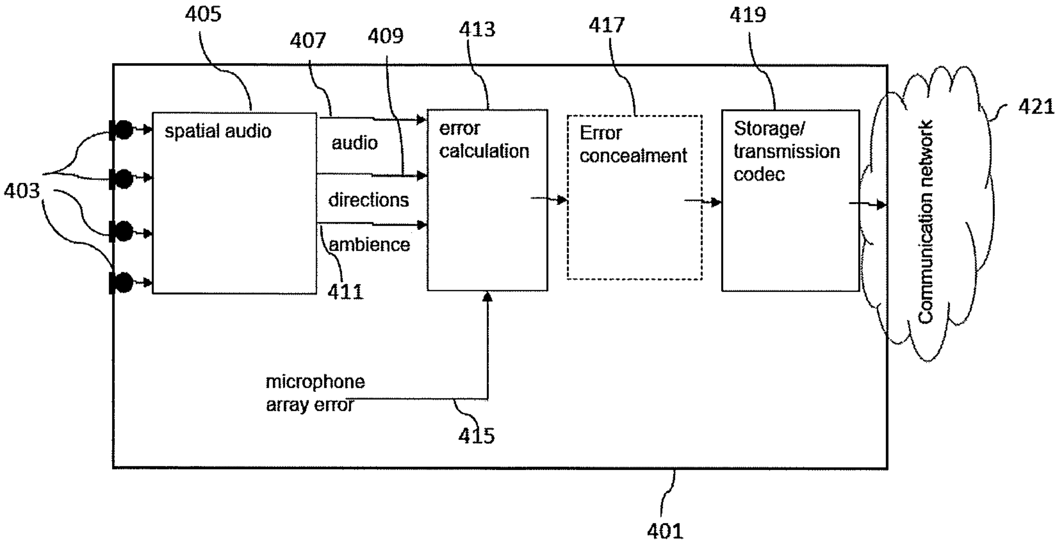
FIG. 4 shows an example device.
Figure 5:
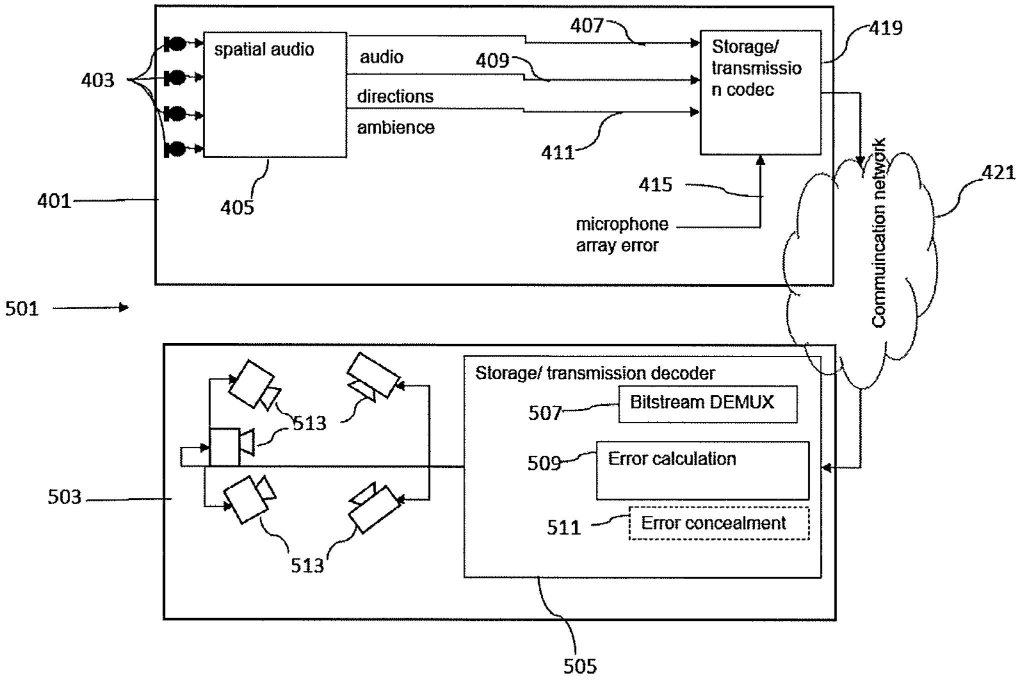
FIG. 5 shows an example system.
Figure 6:
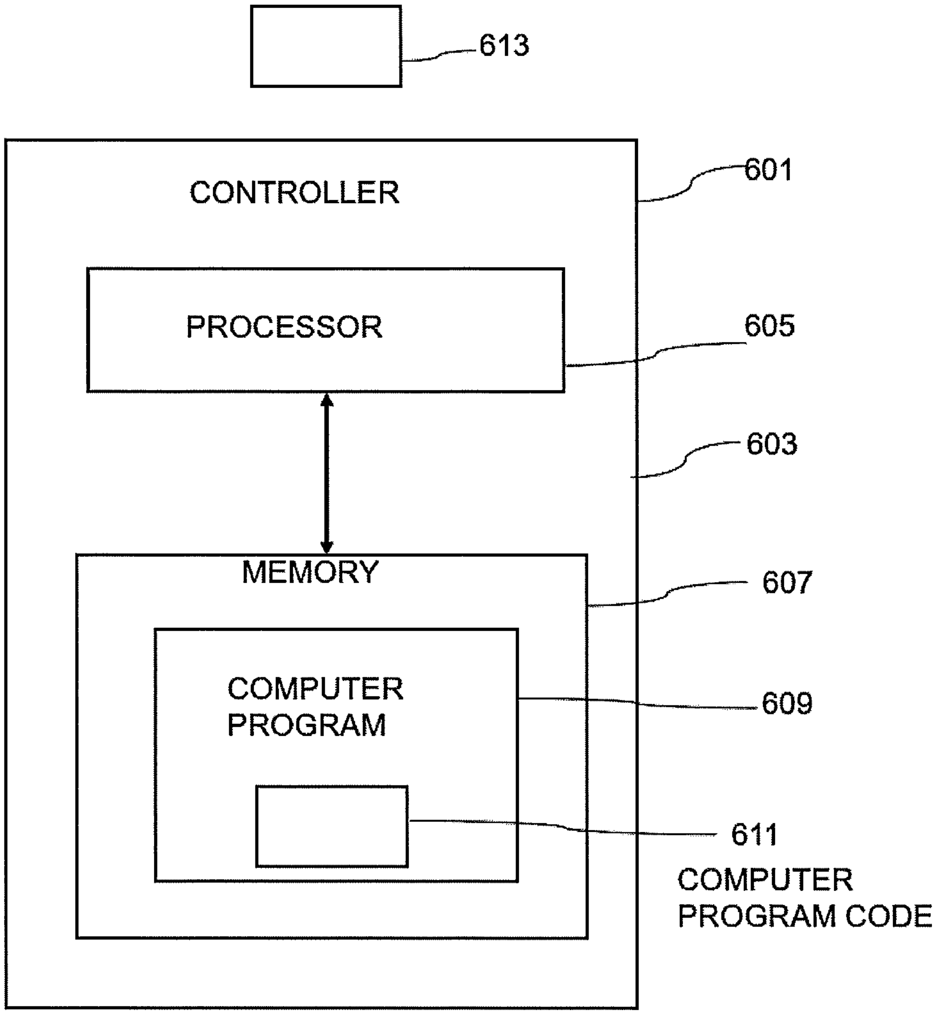
FIG. 6 shows an example apparatus.

FIG. 2 shows an example method according to examples of the disclosure. The method can be performed by an apparatus within an audio capture device or an audio playback device or any other suitable type of device. The method could be implemented using apparatus, devices and systems as shown in FIGS. 4 to 6 or by any other suitable entities.

At block 201 the method comprises obtaining spatial audio and one or more three dimensional parameters.

The spatial audio can comprise audio signals that have been captured by a three-dimensional microphone array. For example, they can be captured by four or more omni directional microphones that are configured so that at least one of the microphones is in a different plane to the other microphones. In some examples the spatial audio could be captured by two or more directional microphones.

The one or more three dimensional parameters comprise one or more direction parameters. The one or more three dimensional parameters can comprise three-dimensional spatial metadata or any other information that enables the spatial audio signals to be rendered such that the three-dimensional effects can be perceived by a user. The three-dimensional spatial metadata can comprise, for one or more frequency sub-bands, information indicative of a sound direction and information indicative of sound directionality. The sound directionality can be an indication of how directional or non-directional the sound is. The sound directionality can provide an indication of whether the sound is ambient sound or provided from point sources. The sound directionality can be provided as energy ratios of direct to ambient sound or in any other suitable format.

The parameters of the spatial metadata can be estimated in time-frequency tiles. The time-frequency tiles can comprise time intervals and frequency bands. The time-intervals can be short time intervals. For example, the time intervals could be 20 ms or any other suitable duration. The frequency bands can be one-third octave bands or Bark bands or any other suitable frequency intervals.

At block 203 the method comprises determining one or more ranges for direction parameters when the one or more three-dimensional parameters are reduced to two dimensions to obtain one or more two-dimensional parameters. The reductions can comprise mapping the three-dimensional parameters to two-dimensions.

The three-dimensional parameters can comprise directions on a plane and at least some directions extending out of the plane. The directions used to provide the three-dimensional parameters do not need to cover all possible directions on the plane. For instance, the three-dimensional parameters can just cover a subset of the possible directions. The directions extending out of the plane can extend above and/or below the plane.

When the three-dimensional parameters are reduced to two-dimensions all of the directions are reduced to the same plane. There are no directions extending out of the plane. The directions used to provide the two-dimensional parameters do not need to cover all possible directions on the plane.

The range could be an area or angular range within the two-dimensional plane. In some examples the range could comprise an error margin. In some examples the range could comprise a spatial area assigned to a sound source to avoid overlap with other sound sources or any other suitable type of range.

Determining one or more ranges for direction parameters can comprise identifying one or more ranges within the three-dimensional spatial metadata and reducing the one or more ranges to two dimensions.

Where the ranges comprise error margins the one or more error margins can be determined using any suitable processes. In some examples the errors and error margins for direction parameters within the spatial metadata can be estimated from measurements such as the variability of direction estimates for a fixed location sound source. In some examples the error can be estimated continuously as the difference between direction estimates and a smoothed version of the direction estimates. In such examples the smoothed version can be a long time average. In some examples the error can be the variability of direction estimates in a given number of recent audio frames. For example, the error can be the variability of direction estimates for five of the last 20 ms audio frames.

In some examples, such as the examples shown in FIGS. 1A to 1D the error could be the same in all directions. In other examples the errors could be different in different directions.

In some examples, instead of calculating the error margins a generic value could be used. For instance, a value such as 10 degrees could be used as a default error margin. In some examples a look-up table could be used. The look-up table could accommodate different error margins being provided in different directions.

Once the error ranges in three-dimensions have been determined this can be reduced to two dimensions. The ranges in two dimensions can be calculated as the front-back range and the left-right range or in any other suitable format.

For instance, where the range comprises an error the front-back error and the left-right error could be calculated as $$\text{FB error}=\|\cos\beta_1-\cos\beta_1\|$$

$$\text{LR error}=\|\sin\beta_2-\sin\beta_1\|$$

A special case arises when the error margin in three dimensions is such that $\varphi>-\pi-\alpha_E$ or $\varphi<-\pi+\alpha_E$. In these cases the error margin 103 encompasses either north or south pole of the unit sphere. In such cases both the front-back error and the left-right error have a numerical value 2.

In some examples ranges in two dimensions can be calculated as the radial range and the tangential range. This can be as an alternative to or in addition to, the front-back ranges and the left-right ranges.

At block 205 the method comprises applying processing to the two-dimensional parameters based on whether or not the ranges in two dimensions are in accordance with one or more criteria. The two-dimensional parameters comprise the three-dimensional parameters reduced or mapped to a two-dimensional plane. The ranges in two dimensions can be considered to be in accordance with the one or more criteria if they are within a threshold range of the one or more criteria or they otherwise satisfy the criteria.

The processes that are used can be based on the type of ranges, the type of spatial audio, the applications of the spatial audio or any other suitable parameters. For instance, where the ranges comprise error margins the processes can comprise error concealment processes. Where the ranges comprise limitations to the position of the sound source the processing can comprise controlling the position of one or more of the sound sources.

Where the processing comprises error concealment, the error concealment processes that are applied can be selected based on the whether or not the error margins in two dimensions are in accordance with one or more criteria. The criteria that determine which error concealment processes are used could be determined based on how perceptible the effects of the errors would be to a user and/or how much they affect the audio quality.

In some examples the criteria could be a threshold magnitude of the errors. For example, if the magnitude of the error margin is above a threshold then a first error concealment process could be applied to the two-dimensional audio signals and if the error margin is below a threshold then no error concealment or a second, different error concealment could be applied.

In some examples the criteria could be whether or not the error margin spans over an axis such as the front-back axis or the left-right axis. if one or more error margins span over an axis relative to a user position a first error concealment process is applied to the two-dimensional audio signals and if the one or more error margins do not span over an axis relative to a user position then no error concealment or a second, different error concealment process is applied to the audio signals. The axis can be defined relative to a user position. For instance, the axis can be defined based on the direction a user is facing or the arrangement of loudspeakers within the audio playback device that is to be used or any other suitable factor.

The error concealment processing can comprise any suitable process which reduces the effects of the errors in the rendered two-dimensional errors. In some examples the error concealment processes can be configured to reduce the effects of the error causing the direction parameter to switch between different sides of an axis.

In some examples the error concealment can comprise reducing the ratio of direct to ambient components in the spatial metadata associated with the audio signals. This reduces the directionality of the audio and makes it more ambient. The amount by which the ratio of direct to ambient components is reduced can be determined by the size of the error margins. The error concealment processes can be configured so that if the error is unchanged when it is converted from three dimensions to two dimensions, or if there is a very small change, then the ratio of direct to ambient components does not change or does not change very much. This could be considered to be applying no error concealment or could be the application of an error concealment process that has no effect, or very little effect, in this circumstance.

If there is a large error then a larger reduction in the ratio of direct to ambient components can be made. For example, if the error in either the front-back axis or the left-right axis is two then this indicates that the error spans over the axis. In such cases the ratio of direct to ambient components could be reduced to zero so that the audio becomes completely, or substantially completely, ambient.

In some examples the error concealment process could comprise smoothing the direction parameters of the spatial metadata. The smoothing could comprise low-pass filtering or any other suitable process. The filtering can occur in time and/or frequency domains. The low pass filtering can reduce the frequency of any changes in the direction caused by the errors. For example, it can reduce the effects of the direction flipping across one or more axis.

In some examples a trajectory of a direction could be identified. The trajectory could be a movement of the direction due to movement of an audio source or movement of the user or any other suitable movement. The projected trajectory can then be smoothed by using low pass filtering which can help to conceal the errors.

In some examples the error concealment process that is to be used can be determined by the arrangement of the loudspeakers that are to be used for playback or any other suitable factors such as the formats used for transmission/storage. For instance, if the playback systems comprise a stereo system or headphones without head tracking then the front-back errors may be less significant than the left-right errors. In such cases the front-back error could be ignored or given a smaller weighting than any left-right errors. An example combined error could be calculated as 1/3*FB_error+2/3*LR_error. This combined error can now be used to obtain values between 0 and 2 which can be reduced to a change in the ratio of direct to ambient components between 1 to 0 and or reduced to a smoothing of the direction components of the spatial metadata.

If the playback system comprises a headphone system with headtracking then front-back errors may be as significant as left-right errors. In such cases the maximum values of the front-back errors and the left-right errors could be used. In such cases there might be no weighting of the respective errors.

Once the process has been applied the audio signals can be rendered using the spatial metadata or other paraments as adjusted based on the process applied at block 205.

In this example although front-back errors and left-right errors have been used it is to be appreciated that error margins along other axis could be used in other examples. For instance, a front-left to rear-left axis and a front-right to rear-right axis could be used.

In some examples of the disclosure or tangential and radial errors could be used. The radial error can be reduced to changes in direct-to-ambient ratio. The radial error approaches zero if the three-dimensional direction parameter is close to the xy plane because there is very little change in the error when the direction is reduced from three-dimensions to two-dimensions. If the radial error is small or below a given threshold then the error concealment processing could be applied so that there is no change, or very little change, to the direct-to-ambient ratio. If the radial error is large or above a given threshold then the error concealment processing could be applied so that the direct-to-ambient is set to zero, or close to zero.

The tangential error can provide an indication of the smoothing that should be applied to direction parameters. If the tangential error is large or above a given threshold then this could indicate that the direction values are unstable. This stability can be improved by using error concealment processes that reduce variance such as low pass filtering.

The different axis could be used if the playback device enables head tracking. When a playback device enables headtracking the most significant directions for the error margins is the left-right direction with respect to the current head position. The second most significant direction for the error margins is the front-back direction with respect to the current head direction. These directions are not fixed but are moving during playback as the user moves their head. In addition, during playback the user might tilt their head. In these cases the plane to which the error margins 103 are to be projected is changed to take into account the new head position. The errors can be projected to the new plane in a similar way to the process shown in FIGS. 1A to 1D.

Where the ranges comprise ranges based on the location of sound sources or ranges applied to avoid overlapping of the sound sources the processing that is applied can be applied to control the direct-to ambient ratio or to reduce overlap of the sound sources or for any other suitable purpose. The criteria that determine which error concealment processes are used could be determined based on how perceptible the effects of the ranges would be to a user and/or how much they affect the audio quality or the overlap of the sound sources or any other criteria.

Figure 3:
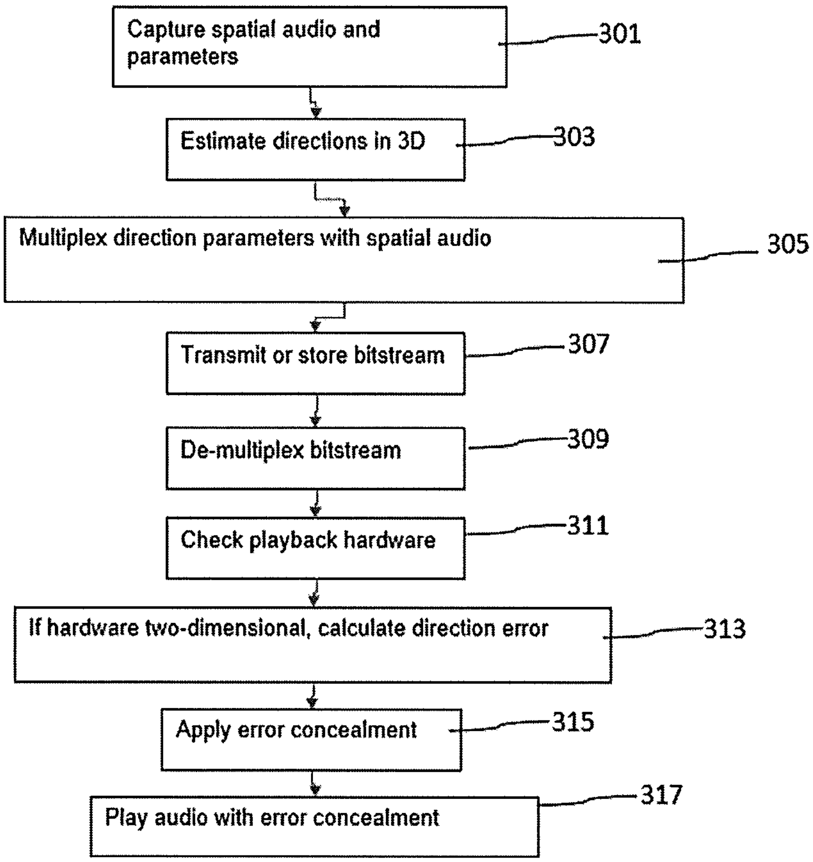
FIG. 3 shows an example method.

FIG. 3 shows another example method that could be implemented in examples of the disclosure. The method could be implemented using apparatus, devices and systems as shown in FIGS. 4 to 6 or by any other suitable entities. In this particular example blocks 301 to 307 could be performed by an audio capture device and blocks 309 to 319 could be performed by an audio playback device. Other distributions of the blocks of the method could be used in other examples of the disclosure.

At block 301 the method comprises capturing spatial audio and associated parameters. Any suitable audio capture device can be used to capture the spatial audio and associated parameters. The audio capture devices can comprise three or more directional microphones or four or more omnidirectional microphones or any other suitable arrangement of the microphones.

At block 303 the method comprises estimating the direction parameters in three-dimensions. The direction parameters can comprise part of the spatial metadata that is associated with the spatial audio or any other suitable parameters.

The direction parameters can be multiplexed with the spatial audio at block 305. The spatial audio and the direction parameters can be multiplexed into a bitstream. The bitstream can be any suitable format that is suitable for transmission and/or storage.

In some examples information about the error margins 103 can also be provided within the bitstream. The error margins can give an indication of the uncertainty of the direction parameters. The error margins 103 can be determined using any suitable process. In examples where other types of ranges are used this information could be provided.

At block 307 the bitstream can be transmitted and/or stored. For example, the bitstream could be transmitted to a playback device to enable the spatial audio to be played back to a user. In some examples the bitstream could be transmitted to a storage device such as a server or other part of a cloud network. The stored bitstream could then be retrieved from the storage device and used for playback as required. In some examples the bitstream might not be transmitted but could be stored in a memory of the audio capture device.

At block 309 the bitstream is de-multiplexed. The de-multiplexing can be performed after the bitstream has been retrieved from storage and/or after the bitstream has been received by a payback device and/or at any other suitable point.

The process that is used for the de-multiplexing can be corresponding to the process used for multiplexing the bitstream. The de-multiplexing can enable the spatial audio, the associated direction parameters and the error margins, or other suitable ranges, to be obtained.

At block 311 the hardware that is to be used for the playback is checked. At this point it can be identified whether or not the playback device can be configured to provide three-dimensional spatial audio or if the playback device could only be configured to provide two-dimensional spatial audio. For instance, the arrangement of the loudspeakers that are to be used to playback the audio signals can be identified. If these are arranged to provide three-dimensional audio then no consideration of the error margins is needed.

However, if it is determined that the loudspeakers are only configured to provide two-dimensional spatial audio, for example if they are all in the same plane, then, at block 313 the error margin, or other range, in two dimensions is identified. Any suitable process can be used to identify the error margins or other ranges.

In some examples an absolute value for the error margins can be identified. In other examples it might be determined whether or not the error margins are in accordance with one or more criteria. For example, it can be identified whether or not the error margin is above a threshold or below or threshold. In some examples the criteria could be whether or not the error margins span across the front-back axis and/or the left-right axis or any other suitable axis.

At block 315 the error concealment processing is applied. The error concealment processing is applied based on the determined error margins in two dimensions. The error concealment processing can be applied based on one or more criteria of the determined error margins. The criteria could be the magnitude of the error margin, whether or not the error margin is above a threshold or below a threshold, whether or not the error margin spans across an axis or any other suitable criteria.

The error concealment processing could comprise any suitable processing. For example, it may comprises reducing the directionality of the audio signals by reducing the direct to ambient ratio or smoothing the direction parameters of the spatial metadata by using a low pass filter or any other suitable processing.

At block 317 the spatial audio is rendered and played back in two dimensions with the appropriate error concealment applied. The error concealment reduces the effects of the error margins in the played back audio and provides for improved quality in the playback of two-dimensional spatial audio.

FIG. 4 schematically shows an example audio capture device 401 that can be used in some examples of the disclosure.

In this example the audio capture device 401 comprises a plurality of microphones 403 configured to enable three-dimensional audio signals to be captured. In this example four microphones 403 are provided. The microphones 403 can comprise omnidirectional microphones that can be positioned relative to each other so as to enable three-dimensional information to be obtained. Other arrangements of the microphones 403 could be used in other examples of the disclosure.

The microphones 403 can comprise any means configured to convert an incident sound signal into an output electronic microphone signal.

The audio capture device 401 is configured so that the microphone signals are provided from the microphones 403 to a spatial audio module 405. The spatial audio module 403 is configured to use the microphone signals to generate the spatial audio and the associated parameters. The associated parameters can comprise three-dimensional parameters. The associated parameters can comprise information that enables playback of the spatial audio in three dimensions by an appropriate playback device. The associated parameters can comprise direction parameters 409 and ambience parameters 411. Other parameters could be used in other examples of the disclosure. The associated parameters can provide three-dimensional spatial metadata.

The capture device 401 is configured so that the three-dimensional spatial audio 407 and the direction parameters 409 and ambience parameters 411 are provided to an error calculation module 413.

The error calculation module 413 can also be configured to receive a microphone array error input 415. The microphone array error input 415 provides an indication of the likelihood of an error within the microphone arrays. This information could be stored within a memory of the audio capture device 401 and retrieved when needed or could be obtained from any other suitable source or location.

The microphone array error input 415 can comprise information about the error margin 103 within three dimensions and/or any other suitable information.

The error calculation module 413 can be configured to determine the error margins for direction parameters 409 when the three-dimensional audio signals 407 and associated three-dimensional spatial metadata are reduced to two dimensions. The errors can be reduced using any suitable process. The reducing of the error margins can enable any suitable type of error to be determined. For instance, it can enable left-right errors, front/back errors radial errors, tangential errors or any combinations of these errors to be determined.

The error calculation module 413 is configured to provide an output indicative of the error margins in two dimensions. The output can provide an indication of the value of the errors or an indication of one or more criteria of the error margins. For instance, the output could comprise an indication that the magnitude of the error margin is above a threshold or that the error margin extends over an axis.

The capture device 401 is configured so that the output indicative of the error margins in two dimensions is provided from the error calculation module 413 to an error concealment module 417. The error concealment module can be configured to determine the error concealment that is to be applied based on whether or not the error margins in two dimensions are in accordance with one or more criteria.

The error concealment can be applied to the direction parameters 409 and ambience parameters 411 by the error concealment module 417. The error concealment can comprise an adjustment of the directionality of the spatial audio or any other suitable process.

The error concealment module 417 is configured to provide adjusted direction parameters and ambience parameters as an output, for example it can provide an adjusted ratio of direct to ambient components. The output from the error concealment module 417 is provided to a codec 419 for encoding the audio signals and associated parameters. The encoding can encode the spatial audio and associated parameters for storage and/or transmission.

The encoded spatial audio and associated parameters can be provided to a communications network 421 to enable encoded spatial audio and associated parameters to be transmitted to another device for storage and/or playback. In the example of FIG. 4 the spatial audio and associated parameters can be transmitted to a cloud storage device, or any other suitable device, where it can be retrieved by any authorized playback device. In some examples the spatial audio and associated parameters could be transmitted to a playback device.

In the example of FIG. 4 the determining of the margin of error in two dimensions and the application of the error concealment process are performed by the audio capture device 401. That is, the same device that captures the spatial audio also determines the error margins. In other examples a first device can be configured to capture the audio and a second, different device could be configured to determine the error margin in two dimensions and/or apply the appropriate error concealment. FIG. 5 shows an example system 501 in which an audio capture device 401 captures the spatial audio and a playback device 503 determines the error and applies the error concealment.

FIG. 5 schematically shows an example system 501 comprising an audio capture device 401 and a playback device 503.

The audio capture device 403 in the example of FIG. 5 comprises a plurality of microphones 403 configured to enable spatial audio and associated three-dimensional parameters to be captured and a spatial audio module 405. These can be configured as described in relation to FIG. 4 or in any other suitable way.

In the example of FIG. 5 the spatial audio module 405 is also configured to provide a spatial audio 407 and direction parameters 409 and ambience parameters 411 as an output. The direction parameters 409 and ambience parameters 411 comprise three-dimensional information.

However, in the example of FIG. 5 the error concealment process is not carried out by the audio capture device 403 and so the spatial audio 407 and three-dimensional direction parameters 409 and ambience parameters 411 are provided to a codec 419 for encoding the spatial audio and associated direction parameters 409 and ambience parameters 411. This enables the codec to encode the spatial audio and associated direction parameters 409 and ambience parameters 411 for storage and/or transmission.

In the example of FIG. 5 the audio capture device 403 is configured so that the codec 419 receives a microphone array error input 415. The microphone array error input 415 provides an indication of the likelihood of an error within the microphone arrays. This information could be stored within a memory of the capture device 401 and retrieved when needed or could be obtained from any other suitable source.

The microphone array error input 415 can comprise information about the error margin 103 within three dimensions and/or any other suitable information.

The codec can be configured to encode the information about the error margin 103 with the spatial audio 407 and the direction parameters 409 and ambience parameters 411. This can enable another device, such as an audio playback device 503 to use the information about the error margin 103 to determine an error in two dimensions and apply appropriate error concealment.

The encoded audio signals and associated spatial metadata can be provided to a communications network 421 to enable encoded audio signals and associated spatial metadata to be transmitted to another device for storage and/or playback. In the example system of FIG. 5 the encoded audio signals and associated spatial metadata are transmitted to an audio playback device 503.

The audio playback device 503 can comprise any device that is configured to render the spatial audio and provide it to one or more loudspeakers for playback to a user. For example, the audio playback device 504 could comprise a headset, a loudspeaker array or any other suitable device.

The audio playback device 503 receives the encoded audio signals and associated spatial metadata from the communications network 421. The encoded audio signals and associated spatial metadata are provided to a decoder 505. The decoder 505 is configured to decode the encoded audio signals and associated spatial metadata. The processes that are used for the decoding can be corresponding processes to the processes used for encoding by the audio capture device 401.

The playback device 503 comprises a bitstream demultiplex module 507 that is configured to demultiplex the spatial audio and associated parameters. The demultiplex module 507 can also be configured to demultiplex the microphone array error information 415 if that has been provided by the audio capture device 403.

This demultiplex module 507 therefore provides the spatial audio 407 and three-dimensional direction parameters 409 and ambience parameters 411 as an output. The output can also comprise the microphone array error information 415 if that has been provided by the audio capture device 403. In other examples the microphone array error information 415 could already be stored in the audio playback device 503.

The spatial audio 407, three-dimensional direction parameters 409 and ambience parameters 411 are provided to an error calculation module 509. The error calculation module 509 can also be configured to receive a microphone array error information 415 if needed.

The error calculation module 509 can be configured to determine the error margins for direction parameters 409 of the spatial metadata when the three-dimensional audio signals 407 and associated three-dimensional spatial metadata are reduced to two dimensions. The errors can be reduced using any suitable process. The reducing of the error margins can enable a left-right error and/or a front/back error to be determined.

The error calculation module 509 of the audio playback device 503 is configured to provide an output indicative of the error margins in two dimensions. The output can provide an indication of the value of the errors or an indication of one or more criteria of the error margins. For instance, the output could comprise an indication that the magnitude of the error margin is above a threshold or that the error margin extends over an axis.

The audio playback device 503 is configured so that the output indicative of the error margins in two dimensions is provided from the error calculation module 509 to an error concealment module 511. The error concealment module 511 can be configured to determine the error concealment that is to be applied based on whether or not the error margins in two dimensions are in accordance with one or more criteria. Any suitable process can be used to determine the error concealment that is to be applied.

The error concealment can be applied to the direction parameters 409 and ambience parameters 411 by the error concealment module 511. The error concealment can comprise an adjustment of the directionality of the spatial audio or any other suitable process.

The error concealment module 511 is configured to provide adjusted spatial metadata as an output, for example it can provide an adjusted ratio of direct to ambient components. The output from the error concealment module 511 is provided to one or more loudspeakers 513 for rendering and playback to a user.

In the examples of FIGS. 3 to 5 the examples of the disclosure are used to determine error margins and the changes in the error margins as the direction parameters are reduced from three-dimensions to two-dimensions and to apply error concealment processing to take this into account. Examples of the disclosure could also be used for other purposes. For instance, in some examples the spatial audio can comprise a plurality of spatial audio objects. The spatial audio objects can have a limited or restricted range of directions.

The spatial audio objects can be limited for any suitable reason. For instance, if the spatial audio comprises a teleconference and the audio objects can comprise participants within the teleconference then the range of directions for the audio objects can be limited to avoid overlapping with other audio objects. In some examples, the audio objects can be limited to directions based on the position of visual objects such as augmented or virtual reality objects.

In such examples the ranges associated with an object can comprise a spatial extent or area from which the audio object can be associated. For instance, a participant in a teleconference can be limited to a range so that the participant can move about relative to their device but so that this movement doesn't cause an overlap with other participants within the teleconference.

These ranges could be assigned to the audio objects by a controller or by any other suitable means. This means that there would be no error within the range because it is assigned rather than measured. In this case the range can be the area or spatial extent that is assigned to the audio object.

When the range is reduced from three-dimensions to two-dimensions the reducing would change the values of the directional parameters. This could be as shown in FIGS. 1A to 1D. In such cases the spatial extent of the range could then become the tangential error. The processing that is applied could then be applied so that the audio object is set as wide as the tangential range in two dimensions.

FIG. 6 schematically illustrates an apparatus 601 according to examples of the disclosure. The apparatus 601 illustrated in FIG. 6 can be a chip or a chip-set. In some examples the apparatus 601 can be provided within a computer or other device that be configured to provide and receive signals. The apparatus 601 could be provided within audio capture devices 401 and/or audio playback devices 503 such as the devices shown in FIGS. 4 and 5 or in any other suitable devices.

In the example of FIG. 6 the apparatus 601 comprises a controller 603. In the example of FIG. 6 the implementation of the controller 603 can be as controller circuitry. In some examples the controller 603 can be implemented in hardware alone, have certain aspects in software including firmware alone or can be a combination of hardware and software (including firmware).

As illustrated in FIG. 6 the controller 603 can be implemented using instructions that enable hardware functionality, for example, by using executable instructions of a computer program 609 in a general-purpose or special-purpose processor 605 that can be stored on a computer readable storage medium (disk, memory etc.) to be executed by such a processor 605.

The processor 605 is configured to read from and write to the memory 607. The processor 605 can also comprise an output interface via which data and/or commands are output by the processor 605 and an input interface via which data and/or commands are input to the processor 605.

The memory 607 is configured to store a computer program 609 comprising computer program instructions (computer program code 611) that controls the operation of the apparatus 601 when loaded into the processor 605. The computer program instructions, of the computer program 609, provide the logic and routines that enables the apparatus 601 to perform the methods illustrated in FIG. 3 The processor 605 by reading the memory 607 is able to load and execute the computer program 609.

The apparatus 601 therefore comprises: at least one processor 605; and at least one memory 607 including computer program code 611, the at least one memory 607 and the computer program code 611 configured to, with the at least one processor 605, cause the apparatus 601 at least to perform:

- obtaining spatial audio and associated one or more three-dimensional parameters wherein the one or more three-dimensional parameters comprise one or more direction parameters;
- determining one or more ranges for direction parameters when the one or more three-dimensional parameters are reduced to two dimensions to obtain one or more two-dimensional parameters; and
- applying processing to the one or more two-dimensional parameters based on whether or not the one or more ranges in two dimensions are in accordance with one or more criteria.

As illustrated in FIG. 6 the computer program 609 can arrive at the apparatus 601 via any suitable delivery mechanism 613. The delivery mechanism 613 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 609. The delivery mechanism can be a signal configured to reliably transfer the computer program 609. The apparatus 601 can propagate or transmit the computer program 609 as a computer data signal. In some examples the computer program 609 can be transmitted to the apparatus 601 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 609 comprises computer program instructions for causing a apparatus 601 to perform at least the following:

obtaining spatial audio and associated one or more three-dimensional parameters wherein the one or more three-dimensional parameters comprise one or more direction parameters;

determining one or more ranges for direction parameters when the one or more three-dimensional parameters are reduced to two dimensions to obtain one or more two-dimensional parameters; and applying processing to the one or more two-dimensional parameters based on whether or not the one or more ranges in two dimensions are in accordance with one or more criteria.

The computer program instructions can be comprised in a computer program 609, a non-transitory computer readable medium, a computer program product, a machine readable medium. In some but not necessarily all examples, the computer program instructions can be distributed over more than one computer program 609.

Although the memory 607 is illustrated as a single component/circuitry it can be implemented as one or more separate components/circuitry some or all of which can be integrated/removable and/or can provide permanent/semi-permanent/dynamic/cached storage.

Although the processor 605 is illustrated as a single component/circuitry it can be implemented as one or more separate components/circuitry some or all of which can be integrated/removable. The processor 605 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software can not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIGS. 2 and 3 can represent steps in a method and/or sections of code in the computer program 609. The illustration of a particular order to the blocks does not necessarily imply that there is a required or preferred order for the blocks and the order and arrangement of the blocks can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
- at least one processor; and
- at least one memory storing instructions that, when executed with the at least one processor, cause the apparatus to:
  - obtain spatial audio and associated one or more three-dimensional parameters, wherein the one or more three-dimensional parameters comprise one or more direction parameters;
  - determine one or more ranges for direction parameters when the one or more three-dimensional parameters are reduced to two dimensions to obtain one or more two-dimensional parameters; and
  - apply processing to the one or more two-dimensional parameters based on whether or not the one or more ranges in two dimensions are in accordance with one or more criteria.

2. An apparatus as claimed in claim 1 wherein determining the one or more ranges for the direction parameters comprises the instructions, when executed with the at least one processor, cause the apparatus to:
- identify one or more ranges within the one or more three-dimensional parameters; and
- reduce the one or more identified ranges to two dimensions.

3. An apparatus as claimed in claim 1, wherein the instructions, when executed with the at least one processor, cause the apparatus to:
- when the one or more ranges are above a threshold, apply a first process to the one or more two-dimensional parameters; and
- when the one or more ranges are below the threshold, apply no process or a second different process is applied to the one or more two-dimensional parameters.

4. An apparatus as claimed in claim 1, wherein the instructions, when executed with the at least one processor, cause the apparatus to:
- when the one or more ranges span over at least one axis relative to a user position, apply a first process to the one or more two-dimensional parameters; and
- when the one or more ranges do not span over the at least one axis relative to the user position, apply no process or a second process to the one or more two-dimensional parameters.

5. An apparatus as claimed in claim 4, wherein the at least one axis comprises at least one of:
- a left-right axis; or
- a front-back axis.

6. An apparatus as claimed in claim 1, wherein the one or more ranges for the direction parameters comprise an error margin.

7. An apparatus as claimed in claim 6, wherein the processing comprises error concealment processing.

8. An apparatus as claimed in claim 7 wherein the error concealment processing comprises at least one of:
- reducing an effect of the error margin within the spatial audio; or
- reducing directionality of the spatial audio.

9. An apparatus as claimed in claim 7, wherein the error concealment processing comprises reducing a ratio of direct to ambient components within the one or more two-dimensional parameters.

10. An apparatus as claimed in claim 1, wherein the one or more ranges for the direction parameters are determined with at least one of: location of a sound source; or movement of the sound source.

11. An apparatus as claimed in claim 10, wherein the processing comprises processing to limit the one or more two dimensional parameters.

12. An apparatus as claimed in claim 1, wherein the instructions, when executed with the at least one processor, cause the apparatus to:
- convert the one or more three-dimensional parameters to two dimensions.

13. An apparatus as claimed in claim 1, wherein the one or more three-dimensional parameters comprise three-dimensional spatial metadata.

14. An apparatus as claimed in claim 13, wherein the three-dimensional spatial metadata comprises, for one or more frequency sub-bands, information indicative of at least one of:
- a sound direction, or
- sound directionality.

15. An apparatus as claimed in claim 1, wherein the spatial audio is based on at least two microphone signals.

16. A method comprising:
- obtaining spatial audio and associated one or more three-dimensional parameters, wherein the one or more three-dimensional parameters comprise one or more direction parameters;
- determining one or more ranges for direction parameters when the one or more three-dimensional parameters are reduced to two dimensions to obtain one or more two-dimensional parameters; and
- applying processing to the one or more two-dimensional parameters based on whether or not the one or more ranges in two dimensions are in accordance with one or more criteria.

17. A method as claimed in claim 16, wherein the determining of the one or more ranges for the direction parameters comprises:
- identifying one or more ranges within the one or more three-dimensional parameters; and
- reducing the one or more identified ranges to two dimensions.

18. A method as claimed in claim 16, further comprising:

when the one or more ranges are above a threshold, applying a first process to the one or more two-dimensional parameters; and when the one or more ranges are below the threshold, applying no process or a second different process is to the one or more two-dimensional parameters.

19. A method as claimed in claim 16, further comprising:

when the one or more ranges span over at least one axis relative to a user position, applying a first process to the one or more two-dimensional parameters; and when the one or more ranges do not span over the at least one axis relative to the user position, applying no process or a second process to the one or more two-dimensional parameters.

20. A non-transitory computer readable medium comprising computer program instructions stored thereon for performing at least the following:

obtaining spatial audio and associated one or more three-dimensional parameters, wherein the one or more three-dimensional parameters comprise one or more direction parameters;

determining one or more ranges for direction parameters when the one or more three-dimensional parameters are reduced to two dimensions to obtain one or more two-dimensional parameters; and applying processing to the one or more two-dimensional parameters based on whether or not the one or more ranges in two dimensions are in accordance with one or more criteria.

* * * * *